United States Patent [19]

O'Brien et al.

[11] Patent Number: 5,919,036
[45] Date of Patent: Jul. 6, 1999

[54] METHOD AND APPARATUS FOR BURNING COMBUSTIBLE GASES

[76] Inventors: Alan O'Brien, R.R. 1, Westlock, Canada, T0G 2L0; Roger J. Charest, 347 Coverdale Crt. N.E., Alberta, Canada, T3K 4J8; Allan Melnyk, Box 866, High Prairie, Alberta, Canada, T0G 1E0

[21] Appl. No.: 08/758,924

[22] Filed: Dec. 2, 1996

[51] Int. Cl.⁶ .................................................. F23D 5/00
[52] U.S. Cl. ............................................. 431/202; 431/2
[58] Field of Search ................................. 431/202, 346, 431/353, 2, 4; 55/45, 52

[56] References Cited

U.S. PATENT DOCUMENTS

| | | | |
|---|---|---|---|
| 3,567,399 | 3/1971 | Altmann et al. | 422/183 |
| 3,798,883 | 3/1974 | Heeney | 55/456 |
| 3,868,210 | 2/1975 | Simpson et al. | 431/4 |
| 3,892,519 | 7/1975 | Reed et al. | 431/202 |
| 4,255,120 | 3/1981 | Straitz, III | 431/202 |
| 4,516,932 | 5/1985 | Chaudot | 431/202 |
| 4,596,586 | 6/1986 | Davies et al. | 55/495.5 |
| 4,838,184 | 6/1989 | Young et al. | 110/346 |
| 4,848,995 | 7/1989 | Samish | 62/633 |
| 5,380,195 | 1/1995 | Reid et al. | 431/202 |

FOREIGN PATENT DOCUMENTS 1253427  5/1989  Canada.
2113764  6/1995  Canada.

OTHER PUBLICATIONS

One–page letter of Altex Oilfield Equipment Ltd. dated Nov. 25, 1996 with two enclosures: two–page memo of Paul Wierzba dated Dec. 1, 1996 entitled "Design Modification to Altex Portable Flare Tank"; three–page promotional pamphlet, undated, of Altex Oilfield Equipment Ltd.

*Primary Examiner*—Larry Jones
*Attorney, Agent, or Firm*—Rodman & Rodman

[57] ABSTRACT

A method and an apparatus for burning combustible gases contained in a mixture comprised of the combustible gases and a liquid. The apparatus comprises: a separator, having an upper end and a lower end. A first portion of the gases is directed out of the upper end and the liquid and a second portion of the gases are directed out of the lower end; an inlet; and a burner which communicates with the upper end such that the first portion contacts the burner for combustion and the combustion creates a vacuum effect which produces an air current outside of the separator from the lower end to the burner. The lower end communicates with the air current such that the second portion is drawn by the air current to the burner. The method comprises the steps of: directing the mixture into the separator and deflecting the liquid out of the lower end; directing the first portion along a first current path towards the upper end and to the burner; burning the first portion in order to produce a second current path; directing the second portion along the second current path to the burner; and burning the second portion.

27 Claims, 2 Drawing Sheets

METHOD AND APPARATUS FOR BURNING COMBUSTIBLE GASES

FIELD OF THE INVENTION

The invention relates to a method and an apparatus for burning combustible gases, contained in a mixture comprised of the combustible gases and a liquid, in a relatively environmentally friendly and safe manner. Further, the invention relates to a portable apparatus for burning the combustible gases.

BACKGROUND OF INVENTION

In the oil and gas industry, environmental concerns have become increasingly important over the years. Typically, any combustible gases vented to the atmosphere from a well are burned in a flare stack or a flare pit built into the ground, both of which are permanently installed at the well site. As the combustible gases are often mixed with liquids, such as hydrocarbons and other contaminants, the use of conventional flare stacks or pits often risks ground contamination of the surrounding area, which produces a potentially environmentally hazardous situation.

For instance, the liquids may not be fully burned as they leave the flare tip of the flare stack or pit and, thus, these liquids may be sprayed onto the surrounding ground and area vegetation. Alternately, if the liquids are burned, contaminated combustion products may build up on the flare tip and on the surrounding ground, if the combustion products are released to the atmosphere. As well, if the liquids are ignited by the burner, flaming liquids may fall onto the installation, the well site or the surrounding area, thus creating a fire, explosion and general safety hazard for the environment and the well site installation and operators.

Further, the combustible gases to be burned by the flare stack or pit often include a combination of lighter combustible gases and heavier combustible gases. Many installations fail to take into account this composition of the combustible gases and therefore, there may be an incomplete combustion of all of the components of the combustible gases. This may result in either the release of some combustible gases to the atmosphere or a backup of the combustible gases in the system. As well, flaming liquids may fall back onto the unburned combustible gases and ignite them.

In response to some of these environmental and other concerns, the industry has produced flare tanks for flaring the gas. Specifically, the combustible gases are flared into a tank which is installed into the ground adjacent to the well. However, when using a flare tank, a secondary containment tank must also be installed under ground for collecting any liquids, transported with the gas, which are not burned by the flare. The permanent installation of a flare tank and a secondary containment tank at the well site may be a very costly solution to the ground contamination problem. In addition, circumstances may arise where a permanently installed flaring unit is either impractical or undesirable. Thus, a portable unit may be preferred.

A number of other apparatuses have attempted to address the environmental and safety concerns noted above in a number of different manners. Several of these apparatuses may be portable.

U.S. Pat. No. 5,380,195 issued Jan. 10, 1995 to Reid et al is directed at a safety flare which is designed to be portable by mounting it upon a skid assembly. The specific flaring unit includes a container which contains a burner that has a number of downwardly directed nozzles. The mixture of the combustible gases and the liquid is directed through the nozzles in the burner so that both the combustible gases and the liquid are burned. The waste materials from the burned liquids and combustible gases are intended to be contained within the container. Although this patent is directed at a portable unit which may inhibit the discharge of waste products to the atmosphere, it may not fully address the other environmental and safety concerns noted above. For instance, if the liquids are fully burned, the contaminated combustion products will likely build up on the downwardly directed nozzles resulting in an inefficient burning of the combustible gases and possible backup in the system. Further, the patent provides for the collection of any unburned liquids in the bottom of the container. If liquids collect in the bottom of the container, the potential exists for flaming liquids or combustion products to fall into these liquids resulting in a fire and explosion hazard. The explosion hazard is increased by the fact that the container for the flaring unit is enclosed.

U.S. Pat. No. 4,255,128 issued Mar. 10, 1981 to Straitz, III is also directed at a portable safety flare contained in a trailer bed. Straitz, III also does not discuss or provide for any separation of the liquid from the combustible gases prior to burning. Rather, the entire mixture is directed through a number of headers or horizontal pipes to a number of vertical stainless steel pipes which extend from the headers at right angles. The vertical stainless steel pipes have burner heads at their upper ends. If the liquid and the combustible gases are not separated in the headers, then the liquid is passed through the burner. If the liquid is fully burned, contaminated combustion products may build up on the burner resulting in incomplete burning of the combustible gases or backup in the headers. If the liquid is not fully burned, any liquid passing through the burners will likely fall into the trailer bed where it may be ignited by flaming liquids and combustion products passing out of the burners. Alternately, the design may permit only lighter combustible gases to rise within the vertical stainless steel pipes for burning by the burners. In this event, the liquid and heavier combustible gases may require draining from the headers. However, there is no discussion in Straitz, III regarding the storage of any liquid nor is there any discussion of the combustion of any heavier combustible gases which do not rise within the vertical stainless steel pipes.

U.S. Pat. No. 4,516,932 issued May 14, 1985 to Chaudot is directed at a safety system designed to eliminate liquids entrained or condensed in combustible gases. This system is not designed to be portable. Chaudot uses a complex series of separators to separate out the liquid in order to avoid condensation and fallout of liquid drops at the burner. Although the system separates out the liquids, it does not take into account the composition of the combustible gases, and specifically, the potential for the combustible gases to include a combination of lighter and heavier combustible gases. Thus, the use of this system may result in an incomplete combustion of all of the combustible gases.

Finally, Canadian Patent No. 1,253,427 issued May 2, 1989 to Quinnell is directed at a non-portable apparatus for igniting flare gas. Quinnell describes an inlet conduit for the mixture of the combustible gases and liquid which extends into a chamber and then bends upwardly in an elbow to form an upwardly projecting extension. The mixture in the inlet conduit is then caused to flow through laterally opening discharge apertures in the wall of the conduit. As a result, the mixture is directed out of the inlet conduit toward the interior wall of the chamber, causing at least some of the entrained liquid in the combustible gases to condense. Quinnell states that the combustible gases will flow upwards towards the igniter, while the liquids will flow downwards towards the lower end of the chamber. However, Quinnell does not take into account the composition of the combustible gases, and specifically, the likely inclusion of heavier combustible gases in the mixture. As a result, any heavier combustible gases may fall downwardly towards the lower end of the chamber with the liquids. Thus, only lighter combustible gases may rise within the chamber for combustion by the igniter.

Each of Reid, Straitz, Quinnell and Chaudot have only partially addressed the environmental and safety concerns noted above. Neither Reid nor Straitz, III appear to deal with any potential problems which may result from the passage of the liquid through the burner nor do they appear to take into account the composition of the combustible gases. As a result, both Reid and Straitz, III may result in a fire hazard and incomplete combustion of all of the components of the combustible gases. While Quinnell and Chaudot may provide for the separation of the liquid from the combustible gases prior to combustion, these apparatuses similarly appear not to take into account the components of the combustible gases and may therefore result in an incomplete combustion of all of the components of the combustible gases.

There is therefore a need in the industry for a method and a relatively simple apparatus for burning combustible gases contained in a mixture of the combustible gases and the liquid, in a relatively efficient, environmentally friendly and safe manner as compared to known apparatuses and methods. Further, there is a need for a method and an apparatus which separate the liquid from the combustible gases prior to the burning of the combustible gases and which take into account both the heavier and lighter components of the combustible gases in the combustion. Finally, there is a need for such an apparatus to be portable.

SUMMARY OF INVENTION

The invention relates to a method and an apparatus for burning combustible gases contained in a mixture comprised of the combustible gases and a liquid in a relatively efficient, environmentally friendly and safe manner as compared to known apparatuses and methods. Further, there is a need for a method and an apparatus which separate the liquid from the combustible gases prior to burning of the combustible gases and which take into account the composition of the combustible gases, including any heavier or lighter components, in order to provide for combustion of substantially all of the combustible gases. Finally, the invention relates to the apparatus being preferably portable.

In the apparatus form of the invention, the invention is comprised of an apparatus for burning combustible gases contained in a mixture comprised of the combustible gases and a liquid, the apparatus comprising:

(a) a separator, having a separator side wall, an upper end and a lower end, for separating the combustible gases from the liquid, and wherein a first portion of the combustible gases is directed out of the upper end of the separator and the liquid and a second portion of the combustible gases are directed out of the lower end of the separator;

(b) an inlet for directing the mixture into the separator; and (c) a burner for combustion of the combustible gases which communicates with the upper end of the separator such that the first portion of the combustible gases directed out of the upper end of the separator contacts the burner for combustion such that the combustion of the combustible gases by the burner creates a vacuum effect which produces an air current outside of the separator moving from the lower end of the separator to the burner;

wherein the lower end of the separator communicates with the air current such that the second portion of the combustible gases directed out of the lower end of the separator is drawn by the air current to the burner for combustion.

The apparatus is preferably further comprised of a conduit having an upper end communicating with the burner and a lower end communicating with the lower end of the separator such that the air current is produced within the conduit so that the second portion of the combustible gases is drawn therethrough. Any form of conduit capable of conducting the air current, and thus the second portion of the combustible gases, therethrough may be used. However, preferably the conduit is comprised of a conduit side wall mounted adjacent to the separator side wall in a spaced relation thereto in order to define the conduit therebetween. Further, the lower end of the separator and the lower end of the conduit may be adjacent to each other and may be open such that the second portion of the combustible gases may pass freely from the lower end of the separator into the lower end of the conduit while the liquid falls away from the lower end of the separator.

As well, the apparatus may be further comprised of a retainer for transiently retaining the second portion of the combustible gases directed out of the lower end of the separator adjacent to the lower end such that the drawing of the second portion through the conduit by the air current is facilitated. Any retainer or other apparatus capable of performing the intended function of the retainer may be used. However, preferably, the retainer is comprised of a retaining tray mounted a spaced distance from the lower end of the separator, wherein the retaining tray has a lower surface which curves downward such that the retention of the second portion of the combustible gases by the retaining tray is facilitated.

Although any separator or other apparatus, capable of performing the intended function of the separator, may be used, the separator is preferably comprised of at least one baffle for contacting the mixture wherein each baffle causes an amount of the liquid to separate from the combustible gases for direction towards the lower end of the separator, while permitting at least the first portion of the combustible gases to pass towards the upper end of the separator. Further, the inlet preferably directs the mixture into the separator towards each baffle for contact therewith.

Although any number of baffles, in any suitable arrangement, capable of causing the separation of the liquid from the combustible gases may be used, preferably the separator is comprised of at least two baffles located within the separator side wall such that the inlet directs the mixture towards the baffles for contact with each baffle in succession. In the preferred embodiment, the separator is comprised of a lower baffle, for causing a first amount of the liquid to separate from the combustible gases upon contact of the mixture with the lower baffle, and an upper baffle located between the lower baffle and the upper end of the separator for causing a second amount of the liquid to separate from the combustible gases upon contact of the mixture with the upper baffle. Further, a longitudinal axis of the separator, extending from the lower end to the upper end, may be substantially vertical and the inlet may have a discharge end extending through the lower end of the separator for directing the mixture into the separator and towards the upper end of the separator.

In the preferred embodiment, the lower baffle has a lower surface and an outer edge, wherein the lower surface is adjacent the discharge end of the inlet for contacting the mixture and deflecting the first amount of the separated liquid towards the lower end of the separator and wherein the outer edge is in a spaced relation with the separator side wall in order to define a space for the passage of at least the first portion of the combustible gases towards the upper baffle. Any shape or configuration of the lower baffle capable of performing its intended function may be used. In addition, the lower baffle may be mounted in the separator in any suitable manner as long as the lower surface of the lower baffle is adjacent the discharge end of the inlet and the lower baffle may perform its function. However, the lower surface of the lower baffle is preferably curved upward such that the first amount of the liquid is deflected towards the lower end of the separator. Further, the lower baffle is preferably mounted within the separator side wall. However, alternately, the lower baffle may be mounted on the discharge end of the inlet.

In the preferred embodiment, the upper baffle has a lower surface and an outer edge mounted to the separator side wall and the upper baffle defines a hole such that the lower surface contacts the mixture and deflects the second amount of the liquid towards the lower end of the separator while permitting at least the first portion of the combustible gases to pass through the hole towards the upper end of the separator. Any shape or configuration of the upper baffle capable of performing its intended function may be used. In addition, the upper baffle may be mounted in the separator in any suitable manner as long as the upper baffle can perform its function. However, the lower surface of the upper baffle is preferably curved downward such that the second amount of the liquid is deflected towards the lower end of the separator. Further, the hole is preferably located in the centre of the upper baffle.

The apparatus is preferably further comprised of a container for collecting the liquid separated from the combustible gases and directed out of the lower end of the separator. The container may be any known type of container suitable for the purpose. Where the apparatus includes a container, the separator, the conduit and the burner are preferably located within the container such that the liquid directed out of the lower end of the separator falls into the container. Further, in the preferred embodiment, the container has an open top end and a closed bottom end and the lower end of the conduit is in a spaced relation from the bottom end in order to permit the production of the air current within the conduit upon the combustion of the combustible gases by the burner.

As well, the apparatus may be further comprised of a gauge for monitoring the level of the liquid in the container and an outlet for removal of the liquid from the container. Any known type of gauge or other device for monitoring the level of the liquid, suitable for the specific use and purpose as described herein, may be used.

Finally, the apparatus may be further comprised of means for transporting the container such that the container is portable. Any known means for, or manner of, transporting the container which is suitable for the intended purpose of the apparatus may be used. However, in the preferred embodiment, the container is mounted on a skid assembly for portability.

In the method form of the invention, the invention is comprised of a method for burning combustible gases contained in a mixture comprised of the combustible gases and a liquid using an apparatus comprised of a separator, having an upper end and a lower end, and a burner communicating with the upper end of the separator. The method comprises the steps of:

(a) directing the mixture into the separator;

(b) separating the combustible gases from the liquid within the separator and deflecting the liquid out of the lower end of the separator;

(c) directing a first portion of the combustible gases along a first current path towards the upper end of the separator and to the burner;

(d) burning the first portion of the combustible gases at the burner in order to produce a second current path extending from the lower end of the separator to the burner, wherein the burning of the combustible gases creates a vacuum effect which produces the second current path;

(e) directing a second portion of the combustible gases towards the lower end of the separator and along the second current path towards the upper end of the separator and to the burner; and (f) burning the second portion of the combustible gases at the burner.

Preferably, the steps of the method are performed on a continuous basis. In addition, the method is preferably performed using the apparatus of the within invention.

SUMMARY OF DRAWINGS

Embodiments of the invention will now be described with reference to the accompanying drawings, in which.

DETAILED DESCRIPTION

Figure 1:
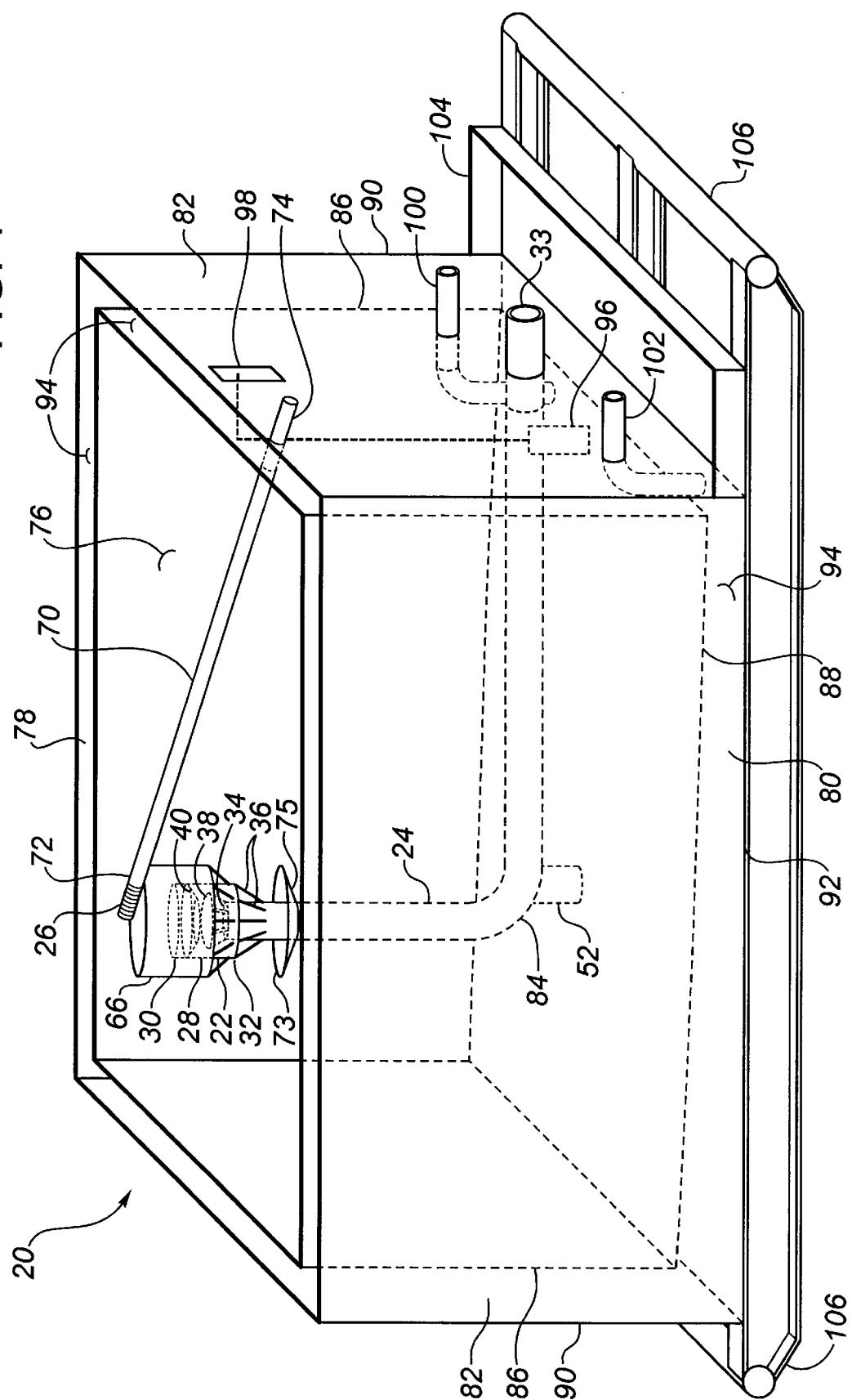
FIG. 1 is a pictorial view of a preferred embodiment of the apparatus.
Figure 2:
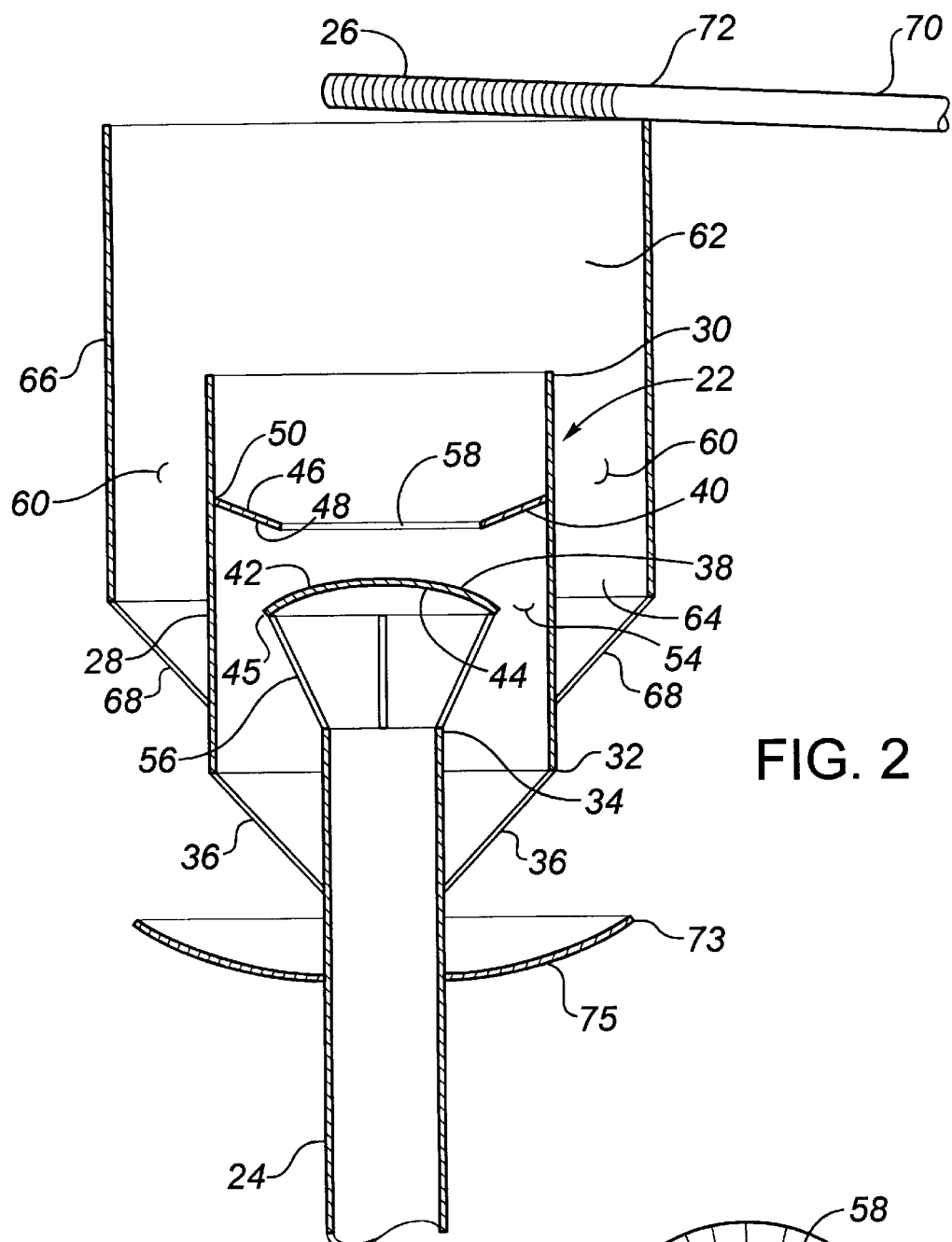
FIG. 2 is a side view of a separator and a conduit of the preferred embodiment of the apparatus as shown in FIG. 1.
Figure 3:
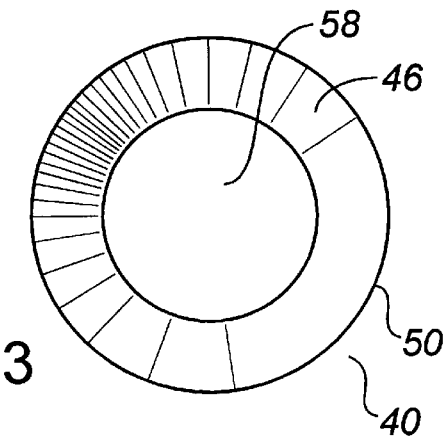
FIG. 3 is a top view of an upper baffle in the separator of the preferred embodiment of the apparatus as shown in FIG. 1.

Referring to FIGS. 1 and 2, the invention is comprised of an apparatus (20) for burning combustible gases contained in a mixture comprised of the combustible gases and a liquid. The combustible gases in the mixture may be comprised of one or more gases capable of combustion upon exposure to a flame, such as hydrocarbon gases. In the preferred embodiment, the combustible gases include at least one heavy combustible gas and at least one light combustible gas. A heavy combustible gas is a combustible gas which has a natural tendency to fall or drop, or go down, within the apparatus (20), and includes gases such as butane. A light combustible gas is a combustible gas which has a natural tendency to rise, or go up, within the apparatus (20), and includes gases such as methane and propane. In the preferred embodiment, the combustible gases are natural gas, which is typically comprised of about 80% to 90% methane.

The liquid in the mixture may be one or more liquids mixed, entrained, condensed or otherwise combined with the combustible gases. Typically, the liquid is comprised of at least an amount of a hydrocarbon, such as oil. Further, the invention is preferably used when the mixture is comprised of a greater percentage of combustible gases than the percentage of the liquid, such as is typically found at a natural gas well. However, although not preferred, the invention may also be used when the mixture is comprised of a greater percentage of liquid than combustible gases, such as in an oil well where the oil includes an amount of entrained gases.

The apparatus (20) is comprised of a separator (22), an inlet (24) for directing the mixture into the separator (22) and a burner (26) for generating a flame. The separator (22) is comprised of a side wall (28), an upper end (30) and a lower end (32). The separator (22) separates the combustible gases from the liquid and directs the liquid towards, and out of, the lower end (32) of the separator (22). Further, the separator (22) directs a first portion of the combustible gases towards, and out of, the upper end (30) of the separator (22) and directs a second portion of the combustible gases towards, and out of, the lower end (32) of the separator (22).

Any combustible gases directed, or permitted to pass, out of the upper end (30) of the separator (22) are defined as the first portion of the combustible gases. The first portion of the combustible gases will typically be substantially comprised of at least one light combustible gas, which will thus have a natural tendency to rise within the separator (22) towards the upper end (30). However, the first portion may also include one or more heavy combustible gases carried along with the light combustible gas out of the upper end (30) of the separator (22). Further, any combustible gases directed, or permitted to pass, out of the lower end (32) are defined as the second portion of the combustible gases. The second portion of the combustible gases is typically substantially comprised of at least one heavy combustible gas which will thus have a natural tendency to fall within the separator (22) towards the lower end (32). However, the second portion may also include one or more light combustible gases carried along with the heavy combustible gas out of the lower end (32) of the separator (22).

On cross section, the side wall (28) of the separator (22) is preferably circular, however, any other shape permitting the overall functioning of the separator (22), as described herein, may be used. Further, the separator (22) has a longitudinal axis extending from its lower end (32) to its upper end (30). In the preferred embodiment, the longitudinal axis of the separator (22) is substantially vertical in order to facilitate the direction of the first portion of the combustible gases out of the upper end (30) and the direction of the liquid and the second portion of the combustible gases out of the lower end (32). However, the longitudinal axis need not be vertical as long as the separator (22) is able to direct the combustible gases and the liquid in the manner described above.

The separator (22) and each of its components, as described below, are preferably comprised of any known materials suitable for the purpose which is corrosion resistant and capable of withstanding the heat produced by the flame generated by the burner (26) and the combustion of the gases. In the preferred embodiment, the separator (22) is comprised of 3/16 inch stainless steel.

The inlet (24) has an intake end (33) and a discharge end (34). The intake end (33) is adapted to be connected to a hydrocarbon well or other source of the mixture. The discharge end (34) extends into the separator (22) for directing the mixture therein. The location of the discharge end (34) in the separator (22) will vary depending upon the specific configuration and operation of the separator (22). However, in the preferred embodiment, the discharge end (34) of the inlet (24) extends through the lower end (32) of the separator (22) and terminates inside the separator (22) in a manner so that the mixture may be directed towards the upper end (30) of the separator (22). Preferably, the discharge end (34) is positioned so that the mixture is discharged in a direction parallel to the longitudinal axis of the separator (22). In the preferred embodiment, the discharge end (34) passes through the centre of the lower end (34) of the separator (22) and has a longitudinal axis coincident with, or superposed on, the longitudinal axis of the separator (22).

The inlet (24), including its discharge end (34), is preferably comprised of a pipe made of a corrosion resistant material capable of withstanding the heat generated by the flame of the burner (26) and the combustion of the gases. In the preferred embodiment, the inlet (24) is comprised of a four inch diameter stainless steel pipe. The separator (22) is preferably supported about the discharge end (34) of the inlet (24) by two or more stainless steel struts (36) extending between the lower end (32) of the separator (22) and the inlet (24), however, any other suitable means for supporting the separator (22) in the required manner may be used.

The separator (22) is comprised of at least one baffle. Each baffle has an upper surface and a lower surface for contacting the mixture in the preferred embodiment. Each baffle causes an amount of the liquid to separate from the combustible gases in order that the separated amount may be directed downwards, towards and out of, the lower end (32) of the separator (22). Further, each baffle directs, and permits the passage of at least the second portion of the combustible gases downwards towards, and eventually out of, the lower end (32) while also permitting the passage of at least the first portion of the combustible gases upwards towards, and eventually out of, the upper end (30) of the separator (22). As the baffle separates the liquid from the combustible gases, the baffle, or baffles, as the case may be, is positioned in the separator (22) relative to the discharge end (34) of the inlet (24) so that the mixture is directed into contact with the baffle. Preferably, each baffle is located in a substantially horizontal plane between the upper and lower ends (30, 32) of the separator (22) such that the longitudinal axis of the separator (22) intersects each baffle.

Where substantially all the liquid is not caused to separate from the combustible gases upon contact of the mixture with a single baffle, the separator (22) may be comprised of two or more baffles, as required to separate substantially all the liquid, located or positioned within the separator side wall (28) in a manner such that the discharge end (34) of the inlet (24) directs the mixture towards the baffles for contact with each baffle in succession. Specifically, the baffles are positioned between the upper and lower ends (30, 32) of the separator (22) in a stacked or layered arrangement. Thus, the mixture is preferably directed out of the discharge end (34) of the inlet (24) towards the lower surface of the baffle nearest the lower end (32) of the separator (22). Upon contact of the mixture with this first baffle, an amount of liquid and an amount of at least the second portion of the combustible gases is directed downwards towards the lower end (32) of the separator (22), while at least the first portion of the combustible gases is permitted to pass towards the upper end (30) of the separator (22). If all of the liquid is not caused to separate from the combustible gases by the first baffle, the mixture is then directed from the first baffle towards the lower surface of the next baffle in succession until it has come into contact with each of the baffles.

In the preferred embodiment, the separator (22) is comprised of two baffles for substantially separating the liquid from the combustible gases, a lower baffle (38) and an upper baffle (40) located or positioned within the separator side wall (28) such that the discharge end (34) of the inlet (24) directs the mixture towards the lower and upper baffles (38, 40) for contact with the baffles (38, 40) in succession. The lower baffle (38) has an upper surface (42), a lower surface (44) and an outer edge (45) and is positioned within the separator (22) between the upper baffle (40) and the lower end (32) of the separator (22). The upper baffle (40) also has an upper surface (46), a lower surface (48) and an outer edge (50) and is positioned within the separator (22) between the lower baffle (38) and the upper end (30) of the separator (22). Thus, the lower baffle (38) causes a first amount of the liquid to separate from the combustible gases upon the contact of the mixture with its lower surface (44). If all the liquid is not separated by the lower baffle (38), the upper baffle (40) causes a second amount of the liquid to separate from the combustible gases upon the contact of the mixture with its lower surface (48).

In the preferred embodiment, the lower surface (44) of the lower baffle (38) is adjacent the discharge end (34) of the inlet (24) in a spaced relation therewith such that the mixture may be directed out of the inlet (24) for contact with the lower surface (44). Preferably, the first amount of the separated liquid is deflected towards the lower end (32) of the separator (22) either by directly deflecting it towards the lower end (32), where it will fall out of the lower end (32) as a result of gravitational forces on the liquid, or by indirectly deflecting it towards the lower end (32) by deflecting it towards the separator side wall (28) such that gravitational forces acting on the liquid will cause it to fall towards and out of the lower end (32). However, the lower baffle (38) may deflect an amount of the liquid back into the inlet (24). As a result, the inlet (24) is further comprised of a drain (52) between the intake and discharge ends (33, 34) for the removal of any liquid which may collect within the inlet (24).

Any configuration or form of lower baffle (38), and positioning within the separator side wall (28), permitting the lower baffle (38) to perform its intended function, as described herein, may be used. However, preferably the outer edge (45) of the lower baffle (38) is in a spaced relation with the separator side wall (28) in order to define a space (54) of sufficient size to permit the passage of at least the first portion of the combustible gases towards the upper end (30) of the separator (22). In the preferred embodiment, in which the separator side wall (28) is circular on cross section, the lower baffle (38) is a circular plate. Thus, the diameter of the lower baffle (38) is less than the diameter of the separator side wall (28). Further, the lower surface (44) of the lower baffle (38) preferably curves upward in a manner, and to the degree necessary, such that the deflection of the first amount of the liquid towards the lower end (32) of the separator (22) is enhanced or facilitated. In other words, the mixture directed out of the inlet (24) comes into contact with a concave surface (44).

The lower baffle (38) may be mounted within the separator (22) in any suitable manner. In the preferred embodiment, the lower baffle (38) is mounted by a plurality of struts (56) to the discharge end (34) of the inlet (24). The struts (56) are sized and positioned so that they do not substantially interfere with the discharge of the mixture from the inlet (24) or the function of the lower baffle (38). Although relatively narrow struts (56) are preferred, thicker or sturdier struts may be used to mount the lower baffle (38) to the discharge end (34). If thicker struts (56) are used, the lower baffle (38) may take the form of a cap (not shown) applied to the discharge end (34) of the inlet (24). Further, the struts (56) may be formed out of the discharge end (34) of the inlet (24). Specifically, the discharge end (34) of the inlet (24) may define a plurality of lateral slots (not shown) in the pipe comprising the inlet (24) such that a strut is formed between two slots. In this case, the mixture would be directed against the cap comprising the lower baffle (38) and then out of the lateral slots. A deflector (not shown) may be mounted on the outer surface of the cap above each of the lateral slots to deflect the mixture coming out of the lateral slots towards the lower end (32) of the separator (22).

Any configuration or form of upper baffle (40), and positioning within the separator side wall (28), permitting the upper baffle (40) to perform its intended function, as described herein, may be used. However, in the preferred embodiment, the upper baffle (40) defines a hole (58), which is preferably located centrally in the upper baffle (40). The central hole (58) is preferably located such that the hole (58) is centered over the lower baffle (38) and is preferably sized to be smaller than the dimensions of the lower baffle (38) while permitting at least the first portion of the combustible gases to pass therethrough relatively unimpeded. Thus, in the preferred embodiment, the diameter of the central hole (58) is smaller than the outer edge (45) of the lower baffle (38). Further, although the upper baffle (40) may be mounted in any suitable manner, the outer edge (50) of the upper baffle (40) is preferably mounted, by seal welding, to the separator side wall (28).

Thus, in the preferred embodiment, in which the separator side wall (28) is circular on cross section, the upper baffle (40) is a circular plate having a circular central hole (58). Further, the lower surface (48) of the upper baffle (40) preferably curves downward in a manner, and to the degree necessary, such that the deflection of the second amount of the liquid towards the lower end (32) of the separator (22) is enhanced or facilitated. In other words, the mixture directed towards the upper baffle (40) comes into contact with a convex surface (48).

As stated, the upper baffle (40) is located within the separator side wall (28) between the lower baffle (38) and upper end (30) of the separator (22) and is in a spaced relation with the lower baffle (38) such that the mixture may pass from the lower baffle (38) towards the lower surface (48) of the upper baffle (40). Thus, the mixture exits the inlet (24) and comes into contact with the lower surface (44) of the lower baffle (38) and the lower baffle (38) deflects the first amount of the separated liquid towards the lower end (32) of the separator (22), along with some or all of the second portion of the combustible gases, in the manner described above. At least the first portion of the combustible gases is permitted to pass towards the upper end (30) of the separator (22). If all of the liquid is not caused to separate from the combustible gases by the lower baffle (38), the mixture is directed from the lower baffle (38) towards the lower surface (48) of the upper baffle (40). Upon contact with the lower surface (48), a second amount of the separated liquid is deflected towards the lower end (32) of the separator (22). In addition, a further amount of the second portion of the combustible gases may also be directed downwards by the lower baffle (38). Again, at least the first portion of the combustible gases is permitted to pass through the hole (58) towards the upper end (30) of the separator (22).

The lower baffle (38) and the upper baffle (40) are preferably comprised of a corrosion resistant material capable of withstanding the heat generated by the flame of the burner (26) and the combustion of the gases. In the preferred embodiment, the lower baffle (38) and upper baffle

(40) are made of about ³⁄₁₆ inch stainless steel. Further, in the preferred embodiment, the diameter of the separator side wall (28) is about ten inches, while the diameter of the lower baffle (38) is about six and ½ inches. The diameter of the discharge end (34) is preferably less than or equal to the diameter of the lower baffle (38), being about four inches in preferred embodiment, however, it may also be greater. The diameter of the central hole (58) in the upper baffle (40) is preferably about six inches. However, in the event the lower baffle (38) is comprised of a cap on the inlet (24), the central hole (58) in the upper baffle (40) is preferably about three inches.

The burner (26) communicates with the upper end (30) of the separator (22) in any suitable manner such that the flame generated by the burner (26) may cause the combustion of the combustible gases. Specifically, the first portion of the combustible gases directed out of the upper end (30) of the separator (22) contacts the flame generated by the burner (26) and is burned. The combustion or burning of this first portion creates a vacuum effect which produces an air current outside of the separator (22) which moves from the lower end (32) of the separator (22) to the burner (26). The lower end (32) of the separator (22) communicates with the air current in any suitable manner such that the second portion of the combustible gases directed out of the lower end (32) of the separator (22) is drawn by the air current to the burner (26), and the burning first portion of the combustible gases, for combustion. Combustion or burning of the second portion of the combustible gases also creates or contributes to the vacuum effect and therefore sustains the air current. Thus, the first portion of the combustible gases is directed along a first current path towards the upper end (30) of the separator (22) and to the burner (26). Further, the air current defines a second current path and a second portion of the combustible gases is drawn along the second current path from the lower end (32) of the separator (22) towards the upper end (30) and to the burner (26).

As stated, the air current is produced outside of the separator (22) along the separator side wall (28) moving from its lower end (32) to its upper end (30) and to the burner (26). No specific apparatus or structure is required for producing the air current or directing the second portion of the combustible gases in the manner described. However, preferably the apparatus (20) further comprises a conduit (60) in which the air current is produced so that the second portion of the combustible gases is drawn therethrough. Specifically, the conduit (60) has an upper end (62) which communicates with the burner (26) and a lower end (64) which communicates with the lower end (32) of the separator (22) such that the air current is produced within the conduit (60) and the second portion of the combustible gases directed out of the lower end (32) of the separator (22) is drawn by the air current into the lower end (64) of the conduit (60), through the conduit (60), and out of the upper end (62) of the conduit (60) to the burner (26).

Any configuration or form of conduit (60) permitting the conduit (60) to perform its intended function may be used. For instance, the conduit (60) may be comprised of one or more pipes or other structures extending outside the separator side wall (28) in a manner permitting the air current to be produced therein and permitting the conduit (60) to perform its intended function as described herein. However, in the preferred embodiment, the conduit (60) is comprised of a conduit side wall (66) mounted adjacent to the separator side wall (28) in a spaced relation thereto in order to define the conduit (60) therebetween. In other words, the conduit side wall (66) is mounted about the separator side wall (28).

In the preferred embodiment, the conduit side wall (66) is also circular on cross section and has a diameter greater than the diameter of the separator side wall (28). The differences between the diameters must be sufficient to permit the conduit (60) defined therebetween to perform its functions. In addition, the separator side wall (28) is preferably centrally located within the conduit side wall (66) such that the size of the conduit (60) is substantially equal about the entire separator side wall (28). The burner (26) and the conduit (60) may be comprised of any corrosion resistant material capable of withstanding the heat generated by the flame produced by the burner (26) and the combustion of the gases. Further, in the preferred embodiment, the burner (26) and the conduit (60) are made of about ³⁄₁₆ inch stainless steel. Further, the conduit side wall (66) has a diameter of about sixteen inches.

Further, the conduit side wall (66) may be mounted to the apparatus (20) in any suitable manner not interfering with the production of the air current or the flow of the second portion of the combustible gases. For instance, the conduit side wall (66) may be mounted to the inlet (24) or the separator side wall (28). In the preferred embodiment, the conduit side wall (66) is mounted to the separator side wall (28) by one or more struts (68) extending between the conduit side wall (66) and the separator side wall (28).

The lower end (32) of the separator (22) and the lower end (64) of the conduit (60) may communicate in any manner permitting the liquid to fall away from the lower end (32) of the separator (22) while also permitting the second portion of the combustible gases to pass freely from the separator (22) into the lower end (64) of the conduit (60). In the preferred embodiment, the lower end (32) of the separator (22) and the lower end (64) of the conduit (60) are open and are adjacent to each other or in sufficient proximity to permit the passage of the second portion of the combustible gases as a result of the air current. The lower ends (32, 64) may be, but need not be, immediately adjacent each other such that the lower ends (32, 64) lie in the same horizontal plane.

Further, the upper end (30) of the separator (22) and the upper end (62) of the conduit (60) may communicate with the burner (26) in any manner permitting the first and second portions of the combustible gases to contact the flame generated by the burner (26) and permitting the air current to be produced in the conduit (60) by the creation of a vacuum effect described above. In the preferred embodiment, the upper ends (30, 62) are open. Further, the upper end (62) of the conduit (60) extends beyond the upper end (30) of the separator (22) towards the burner (26). Thus, the first portion of the combustible gases exits the upper end (30) of the separator (22) and is directed, along with the second portion of the combustible gases, by the conduit side wall (66) to the burner (26). The burner (26) is located adjacent the upper end (62) of the conduit (60).

The burner (26) may be contained within a flame arrester (not shown). In addition, a shot tube (70) having a first end (72) and a second end (74) is preferably used to light the burner (26) by shooting a flare into the shot tube (70) at its second end (74). The first end (72) of the shot tube (70) communicates with the burner (26) so that the flare can ignite the burner (26) and generate a flame. Once the flame is initially generated, typically, the flame is sustained by the continuous burning of the combustible gases However, any other known devices or methods for igniting the burner (26) may be used. In the preferred embodiment, the first end (72) of the shot tube (70) is also made of ³⁄₁₆ inch stainless steel.

The air current generated by the apparatus (20) draws substantially all of the second portion of the combustible gases through the conduit (60) upon the exiting of the second portion from the lower end (32) of the separator (22). However, in some circumstances, such as for example, where the air current is insufficient to immediately draw the second portion through the conduit (60) or where a large amount of combustible gases forms the second portion, this process may need to be facilitated. Thus, the apparatus (20) further preferably includes a retainer for transiently retaining the second portion of the combustible gases, which are directed out of the lower end (32) of the separator (22), adjacent or proximate to the lower end (32) pending the drawing of the second portion by the air current into the conduit (60). By transiently retaining the second portion in sufficient proximity to the lower end (32) of the separator (22), and the lower end (64) of the conduit (60) in the preferred embodiment, after the second portion exits or is directed out of the lower end (32) of the separator (22), the retainer permits and facilitates the drawing of the second portion of the combustible gases through the conduit (60) as a result of the air current. Thus, the second portion is only transiently or temporarily retained adjacent or proximate to the lower end (32) pending the drawing of the second portion by the air current into the conduit (60).

Any configuration or form of the retainer, and positioning in relation to the lower end (32) of the separator (22), permitting the retainer to perform its intended function, as described herein, may be used. However, in the preferred embodiment, the retainer is comprised of a retaining tray (73) mounted a spaced distance from the lower end (32). Specifically, the retaining tray (73) is preferably mounted about the outer surface of the inlet (24) such that the second portion is not permitted to pass between the retaining tray (73) and the inlet (24). The retaining tray (73) is mounted at a position on the inlet (24) a spaced distance from the lower end (32) of the separator (22). The distance between the lower end (32) and the retaining tray (73) may be any distance which permits the second portion of the combustible gases to be readily drawn by the air current into the conduit (60), while not interfering with the intended function of the separator (22) and the conduit (60) or the production of the air current, as described herein.

As stated, the retaining tray (73) may be of any shape or configuration. However, in the preferred embodiment in which the separator side wall (28) is circular on cross section, the retaining tray (73) is a circular plate mounted about the inlet (24). Further, the retaining tray (73) has a lower surface (75) which preferably curves downward in a manner, and to the degree necessary, such that the retention of the second portion of the combustible gases by the retaining tray (73) is facilitated. In other words, the second portion of the combustible gases directed out of the lower end (32) downwards towards the retaining tray (73) comes into contact with a concave surface. As well, in the preferred embodiment, the diameter of the retaining tray (73) is preferably equal to or greater than the diameter of the lower end (32) of the separator (22) to further facilitate retention of the second portion of the combustible gases by the retaining tray (73).

The retaining tray (73) is preferably comprised of a corrosion resistant material capable of withstanding the heat generated by the flame of the burner (26) and the combustion of the gases. In the preferred embodiment, the retaining tray (73) is made of about 3/16 inches stainless steel.

As well, the apparatus is further preferably comprised of a container (76) for collecting the liquid separated from the combustible gases and directed out of the lower end (32) of the separator (22). However, any other suitable devices for collecting the separated liquid, such that the liquid is not released to the environment, may be used. In the preferred embodiment, the container (76) has a top end (78), a bottom end (80) and a side wall (82). Further, the separator (22), the conduit (60) and the burner (26) are all located within the container (76). As a result, any separated liquid directed out of the lower end (32) of the separator (22) may simply fall directly into the container (76). Further, the container (76) provides protection to users of the apparatus (20) against the heat resulting from the burning of the combustible gases. As a result, the separator (22), the conduit (60) and the burner (26) are preferably centrally located within the container (76) with respect to the side wall (82).

Accordingly, both the shot tube (70) and the inlet (24) must extend into the container (76) from outside of the container (76). Specifically, the second end (74) of the shot tube (70) is located outside of the container (76) for easy access by the user of the apparatus (20). As well, the intake end (33) of the inlet (24) is located outside of the container (76) for connection to the source of the mixture. In the preferred embodiment, the inlet (24) extends into the container (76) substantially parallel to the bottom end (80) of the container (76) to about the centre of the bottom end (80) and then bends upwards in a curve (84) to the separator (22) such that the discharge end (34) of the inlet (24) passes through the lower end (32) of the separator (22) as described above.

The inlet (24) extends upwards from the curve (84) towards the top end (78) of the container (76) so that the lower end (64) of the conduit (60) is in a spaced relation from the bottom end (80) in order to permit the production of the air current within the conduit (60). In other words, there must be sufficient space to allow an air draft into the lower end (64) of the conduit (60). Thus, the length of the inlet (24) between the curve (84) and the discharge end (34) must be such that the burner (26) is contained within the container (76) while permitting the production of the air current in the conduit (60).

Although the inlet (24) is initially substantially parallel to the bottom end (80), it may slope slightly downwards towards the bottom end (80) in the direction of the curve (84) in order that any separated liquid in the inlet (24) drains towards the curve (84). The drain (52) in the inlet (24) is preferably located at or adjacent to the curve (84).

Further, the container (76) preferably has an open top end (78) in order to permit air flow from the surrounding environment into the container (76). The open top end (78) also reduces the risk of explosion on use of the apparatus (20). To further enhance the safety and environmental friendliness of the apparatus (20), the container (76) is preferably comprised of a double containment system. Thus, the container (76) includes an inner containment system comprised of an inner side wall (86) connected to an inner bottom wall (88) in a spaced relation with an outer containment system comprised of an outer side wall (90) connected to an outer bottom end (92). Thus, a space (94) is defined between the inner and outer containment systems which permits gases and the atmosphere to freely pass between the bottom end (80) and the side wall (82) within the space (94) and also out of the space (94) to the environment. The space (94) is allowed to vent to the environment at the top end (78) of the container (76) in order to minimize any explosion hazard in the event liquid leaks into the space (94) from the inner containment system or any combustible gases get into the space (94). Thus, the outer containment system acts as a backup to the inner containment system in the event the inner containment system fails.

The container (76) may be made of any suitable material for the functions it is to perform, as described herein.

However, in the preferred embodiment, the inner containment system is made of ¼ inch forty four weight steel plate and the outer containment system is made of 3/16 inch forty four weight steel plate. Further, the container (76) can be any size suitable for its intended use. However, in the preferred embodiment, the inner containment system preferably has a volume capacity of about fifty two hundred gallons, while the volume capacity of the space (94) is about twelve hundred gallons.

During the operation of the apparatus (20), it is preferable that the amount of the liquid contained in the container (76) be monitored and removed, as necessary, to decrease the potential for a spill to the environment and the potential for the accidental combustion of the liquid. In addition, removal of the liquid maximizes the holding capacity of the container (76) in the event of failure of the apparatus (20). Therefore, the apparatus (20) preferably includes any suitable device, apparatus or gauge for monitoring the level of the liquid in the container (76). In the preferred embodiment, the monitoring device is comprised of a float (96) located within the container (76) adjacent the inner bottom end (88). The float (96) is operably connected to a level gauge (98) which is located outside of the container (76) to facilitate viewing of the level gauge (98) by the user of the apparatus (20).

Further, in order to facilitate the removal of any liquid from the container (76), the apparatus (20) is further comprised of a first outlet (100) and a second outlet (102). The first outlet (100) is comprised of a pipe extending from the outside of the outer side wall (90) through the inner side wall (86) and into the container (76) adjacent the inner bottom end (88) for removal of liquid in the container (76). The second outlet (102) is comprised of a pipe extending from outside of the outer side wall (90) into the space (94) adjacent the outer bottom end (92) for removal of liquid in the space (94). Both the first and second outlets (100, 102) are comprised of suitable materials for the purpose they perform. Further, in order to facilitate the removal of the liquid, both the inner bottom end (88) and the outer bottom end (92) may be sloped towards the first and second outlets (100, 102) respectively.

In the preferred embodiment, to facilitate the use of the apparatus (20), the second end (74) of the shot tube (70), the level gauge (98), the intake end (33) of the inlet (24) and the first and second outlets (100, 102) may all be located outside the container (76) in relatively close proximity to each other, such as all at one end of the side wall (82) of the container (76). A drip pan (104), having a sufficient volume capacity, may then be located beneath the intake end (33) of the inlet (24) and the first and second outlets (100, 102) to catch and collect any liquid leaking therefrom.

Finally, the apparatus (20) may be further comprised of any known devices, apparatuses or means for transporting the container (76) such that the container (76) is portable, including wheels, skids, rollers or the like. In the preferred embodiment, the container (76) is mounted on a skid assembly (106). The skid assembly (106) is comprised of two or more elongate skids mounted parallel to the longitudinal axis of the container (76). In addition to making the entire apparatus (20) portable, the skid assembly (106) may strengthen the container (76). The skid assembly (106) is constructed of any suitable material capable of transporting the apparatus (20) and bearing its weight.

The within invention is also comprised of a method for burning the combustible gases contained in the mixture. Preferably, the method is performed using the apparatus (20) comprised of the separator (22) and the burner (26). Most preferably, the method is performed using the specific preferred apparatus (20) as described herein.

The method comprises the steps of directing the mixture into the separator (22) and separating the combustible gases from the liquid within the separator (22) and deflecting the liquid out of the lower end (32) of the separator (22). The first portion of the combustible gases is then directed along the first current path towards the upper end (30) of the separator (22) and to the burner (26). The first portion of the combustible gas is burned at or adjacent to the burner (26) in order to produce the second current path extending from the lower end (32) of the separator (22) to the burner (26), wherein the burning of the combustible gases creates a vacuum effect which produces the second current path. The second portion of the combustible gases is directed towards the lower end (32) of the separator (22) and along the second current path towards the upper end (30) of the separator (22) and to the burner (26). The second portion of the combustible gases is then burned at the burner (26). Preferably, the steps of the method are performed on a continuous basis.

The embodiments of the invention in which an exclusive property or privilege is claimed are defined as follows:

1. An apparatus for burning combustible gases contained in a mixture comprised of the combustible gases and a liquid, the apparatus comprising:

(a) a separator, having a separator side wall, an upper end and a lower end, for separating the combustible gases from the liquid, and wherein a first portion of the combustible gases is directed out of the upper end of the separator and the liquid and a second portion of the combustible gases are directed out of the lower end of the separator;

(b) an inlet for directing the mixture into the separator; and (c) a burner for combustion of the combustible gases which communicates with the upper end of the separator such that the first portion of the combustible gases directed out of the upper end of the separator contacts the burner for combustion and such that the combustion of the combustible gases by the burner creates a vacuum effect which produces an air current outside of the separator moving from the lower end of the separator to the burner;

wherein the lower end of the separator communicates with the air current such that the second portion of the combustible gases directed out of the lower end of the separator is drawn by the air current to the burner for combustion.

2. The apparatus as claimed in claim 1 further comprising a conduit having an upper end communicating with the burner and a lower end communicating with the lower end of the separator such that the air current is produced within the conduit so that the second portion of the combustible gases is drawn therethrough.

3. The apparatus as claimed in claim 2 wherein the conduit is comprised of a conduit side wall mounted adjacent to the separator side wall in a spaced relation thereto in order to define the conduit therebetween.

4. The apparatus as claimed in claim 3 wherein the lower end of the separator and the lower end of the conduit are adjacent to each other and are open such that the second portion of the combustible gases may pass freely from the lower end of the separator into the lower end of the conduit while the liquid falls away from the lower end of the separator.

5. The apparatus as claimed in claim 4 further comprising a retainer for transiently retaining the second portion of the combustible gases directed out of the lower end of the separator adjacent to the lower end such that the drawing of the second portion through the conduit by the air current is facilitated.

6. The apparatus as claimed in claim 5 wherein the retainer is comprised of a retaining tray mounted a spaced distance from the lower end of the separator, wherein the retaining tray has a lower surface which curves downward such that the retention of the second portion of the combustible gases by the retaining tray is facilitated.

7. The apparatus as claimed in claim 4 wherein the separator is comprised of at least one baffle for contacting the mixture wherein each baffle causes an amount of the liquid to separate from the combustible gases for direction towards the lower end of the separator, while permitting at least the first portion of the combustible gases to pass towards the upper end of the separator.

8. The apparatus as claimed in claim 7 wherein the inlet directs the mixture into the separator towards each baffle for contact therewith.

9. The apparatus as claimed in claim 8 wherein the separator is comprised of at least two baffles located within the separator side wall such that the inlet directs the mixture towards the baffles for contact with each baffle in succession.

10. The apparatus as claimed in claim 9 wherein a longitudinal axis of the separator, extending from the lower end to the upper end, is substantially vertical and wherein the inlet has a discharge end extending through the lower end of the separator for directing the mixture into the separator and towards the upper end of the separator.

11. The apparatus as claimed in claim 10 wherein the separator is comprised of a lower baffle, for causing a first amount of the liquid to separate from the combustible gases upon contact of the mixture with the lower baffle, and an upper baffle located between the lower baffle and the upper end of the separator for causing a second amount of the liquid to separate from the combustible gases upon contact of the mixture with the upper baffle.

12. The apparatus as claimed in claim 11 wherein the lower baffle has a lower surface and an outer edge, wherein the lower surface is adjacent the discharge end of the inlet for contacting the mixture and deflecting the first amount of the separated liquid towards the lower end of the separator and wherein the outer edge is in a spaced relation with the separator side wall in order to define a space for the passage of at least the first portion of the combustible gases towards the upper baffle.

13. The apparatus as claimed in claim 12 wherein the lower surface of the lower baffle curves upward such that the first amount of the liquid is deflected towards the lower end of the separator.

14. The apparatus as claimed in claim 12 wherein the lower baffle is mounted on the discharge end of the inlet.

15. The apparatus as claimed in claim 13 wherein the upper baffle has a lower surface and outer edge mounted to the separator side wall and wherein the upper baffle defines a hole such that the lower surface contacts the mixture and deflects the second amount of the liquid towards the lower end of the separator while permitting at least the first portion of the combustible gases to pass through the hole towards the upper end of the separator.

16. The apparatus as claimed in claim 15 wherein the lower surface of the upper baffle curves downward such that the second amount of the liquid is deflected towards the lower end of the separator.

17. The apparatus as claimed in claim 16 wherein the hole is located in the centre of the upper baffle.

18. The apparatus as claimed in claim 11 further comprising a retainer for transiently retaining the second portion of the combustible gases directed out of the lower end of the separator adjacent to the lower end such that the drawing of the second portion through the conduit by the air current is facilitated.

19. The apparatus as claimed in claim 18 wherein the retainer is comprised of a retaining tray mounted a spaced distance from the lower end of the separator, wherein the training tray has a lower surface which curves downward such that the retention of the second portion of the combustible gases by the retaining tray is facilitated.

20. The apparatus as claimed in claim 11 wherein the apparatus is further comprised of a container for collecting the liquid separated from the combustible gases and directed out of the lower end of the separator.

21. The apparatus as claimed in claim 20 wherein the separator, the conduit and the burner are located within the container such that the liquid directed out of the lower end of the separator falls into the container.

22. The apparatus as claimed in claim 21 wherein the container has an open top end and a closed bottom end and wherein the lower end of the conduit is in a spaced relation from the bottom end in order to permit the production of the air current within the conduit upon the combustion of the combustible gases by the burner.

23. The apparatus as claimed in claim 22 wherein the apparatus is further comprised of a gauge for monitoring the level of the liquid in the container and an outlet for removal of the liquid from the container.

24. The apparatus as claimed in claim 22 wherein the apparatus is further comprised of means for transporting the container such that the container is portable.

25. The apparatus as claimed in claim 24 wherein the container is mounted on a skid assembly.

26. A method for burning combustible gases contained in a mixture comprised of the combustible gases and a liquid using an apparatus comprised of a separator, having an upper end and a lower end, and a burner communicating with the upper end of the separator, the method comprising the steps of:

(a) directing the mixture into the separator;

(b) separating the combustible gases from the liquid within the separator and deflecting the liquid out of the lower end of the separator;

(c) directing a first portion of the combustible gases along a first current path towards the upper end of the separator and to the burner;

(d) burning the first portion of the combustible gases at the burner in order to produce a second current path extending from the lower end of the separator to the burner, wherein the burning of the combustible gases creates a vacuum effect which produces the second current path;

(e) directing a second portion of the combustible gases towards the lower end of the separator and along the second current path towards the upper end of the separator and to the burner;

(f) burning the second portion of the combustible gases at the burner.

27. The method as claimed in claim 26 wherein the steps are performed on a continuous basis.

* * * * *